US011697323B2

(12) United States Patent
Tashiro et al.

(10) Patent No.: US 11,697,323 B2
(45) Date of Patent: Jul. 11, 2023

(54) FOGGING SUPPRESSION APPARATUS AND CONTROL METHOD THEREOF

(71) Applicant: HONDA MOTOR CO., LTD., Tokyo (JP)

(72) Inventors: Yoshiyuki Tashiro, Wako (JP); Shintaro Ohtaki, Wako (JP); Tatsunori Kobayashi, Wako (JP); Nobuharu Nagaoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 585 days.

(21) Appl. No.: 16/796,293

(22) Filed: Feb. 20, 2020

(65) Prior Publication Data

US 2020/0282804 A1    Sep. 10, 2020

(30) Foreign Application Priority Data

Mar. 5, 2019   (JP) .............................. JP2019-039743

(51) Int. Cl.
*B60H 1/00*    (2006.01)
*B60S 1/02*    (2006.01)
*H05B 3/84*    (2006.01)

(52) U.S. Cl.
CPC ..... *B60H 1/00785* (2013.01); *B60H 1/00792* (2013.01); *B60S 1/026* (2013.01); *H05B 3/84* (2013.01)

(58) Field of Classification Search
CPC ............ B60H 1/00785; B60H 1/00792; B60H 1/2218; B60H 1/3255; F25B 2700/2106; B60S 1/026; H05B 3/84
See application file for complete search history.

(56) References Cited

U.S. PATENT DOCUMENTS

| | | | |
|---|---|---|---|
| 11,007,980 B2 | 5/2021 | Oikawa | |
| 2014/0034266 A1 | 2/2014 | Tabei et al. | |
| 2018/0056942 A1 | 3/2018 | Oikawa | |
| 2020/0231018 A1* | 7/2020 | Kudo | B60H 1/00785 |
| 2020/0238790 A1* | 7/2020 | Nishiyama | B60H 1/00657 |
| 2021/0229635 A1 | 7/2021 | Oikawa | |

FOREIGN PATENT DOCUMENTS

| | | |
|---|---|---|
| CN | 103492202 A | 1/2014 |
| CN | 104859596 A | 8/2015 |
| JP | 2010-36592 A | 2/2010 |
| JP | 2018-034522 A | 3/2018 |

OTHER PUBLICATIONS

Office Action dated Apr. 1, 2022, issued in counterpart JP Application No. 2019-039743, with Partial English translation. (4 pages).
Office Action dated Feb. 16, 2023, issued in counterpart CN application No. 202010102856.5 with English translation. (10 pages).

* cited by examiner

*Primary Examiner* — Marc E Norman
(74) *Attorney, Agent, or Firm* — WHDA, LLP (57) ABSTRACT

A fogging suppression apparatus that suppresses fogging of a window of vehicle, comprises an acquisition unit that acquires an external temperature of the vehicle, a heater that heats the window, the heater differing from an air conditioning apparatus including a blower provided in the vehicle; and a control unit that controls the heater so as to heat the window when the external temperature of the vehicle is lower than or equal to a predetermined temperature and there is a request for activation of the air conditioning apparatus.

7 Claims, 5 Drawing Sheets

FOGGING SUPPRESSION APPARATUS AND CONTROL METHOD THEREOF

CROSS-REFERENCE TO RELATED APPLICATION

This application claims priority to and the benefit of Japanese Patent Application No. 2019-039743 filed on Mar. 5, 2019, the entire disclosure of which is incorporated herein by reference.

BACKGROUND OF THE INVENTION

Field of the Invention

The present invention relates to techniques for suppressing window fogging.

Description of the Related Art

Air conditioning units mounted on vehicles are installed with defrosters that blow out warm air along windshields from below in order to suppress window fogging. However, there are cases in which fogging is not effectively suppressed due to the relationship between the outside temperature, the traveling state of the vehicle, and the temperature inside the vehicle cabin. Due to this, a fogging suppression function is proposed (see Japanese Patent Laid-Open No. 2010-36592) in which heaters for fogging suppression are installed in a window, and the heaters are energized and heated if the outside temperature is no higher than a predetermined temperature and the traveling speed is no lower than a predetermined vehicle speed.

However, the above-described fogging suppression function is not necessary if the outside temperature is no higher than the predetermined temperature and the traveling speed is no lower than the predetermined vehicle speed. Due to this, depending upon conditions, there can be cases in which the heaters are activated at unnecessary timings.

SUMMARY OF THE INVENTION

The present invention has been made in consideration of the aforementioned problems, and realizes techniques for appropriately controlling a fogging suppression function so that unnecessary heating is not performed.

In order to solve the aforementioned problems, the first aspect of the present invention provides a fogging suppression apparatus that suppresses fogging of a window of vehicle, comprising: an acquisition unit that acquires an external temperature of the vehicle; a heater that heats the window, the heater differing from an air conditioning apparatus including a blower provided in the vehicle; and a control unit that controls the heater so as to heat the window when the external temperature of the vehicle is lower than or equal to a predetermined temperature and there is a request for activation of the air conditioning apparatus.

In order to solve the aforementioned problems, the second aspect of the present invention provides a method of controlling a fogging suppression apparatus that suppresses fogging of a window of a vehicle, wherein the fogging suppression apparatus includes: an acquisition unit that acquires an external temperature of the vehicle; and a heater that heats the window, the heater differing from an air conditioning apparatus including a blower provided in the vehicle, and the control method comprises controlling the heater so as to heat the window when the external temperature of the vehicle is lower than or equal to a predetermined temperature and there is a request for activation of the air conditioning apparatus.

According to the present invention, the fogging suppression function can be controlled appropriately so that unnecessary heating is not performed.

Other features and advantages besides those discussed above shall be apparent to those skilled in the art from the description of an embodiment of the invention as follows. In the description, reference is made to accompanying drawings, which form a part thereof, and which illustrate an example of the invention. Such an example, however, is not exhaustive of the various embodiments of the invention, and therefore reference is made to the claims which follow the description for determining the scope of the invention.

DESCRIPTION OF THE EMBODIMENT

Hereinafter, an embodiment will be described in detail with reference to the attached drawings. Note that the following embodiment is not intended to limit the scope of the claimed invention, and limitation is not made to an invention that requires all combinations of features described in the embodiment. Two or more of the multiple features described in the embodiment may be combined as appropriate. Furthermore, the same reference numerals are given to the same or similar configurations, and redundant description thereof is omitted.

Description of Structure

First, constituent elements of a fogging suppression apparatus according to the present embodiment will be described with reference to FIGS. 1A and 1B and FIGS. 2A and 2B.

The fogging suppression apparatus 1 according to the present embodiment is installed in a vehicle, such as automobiles, railway vehicles, and airplanes. For example, automobiles include automobiles with internal combustion engines, hybrid automobiles, electric automobiles, etc. The fogging suppression apparatus 1 according to the present embodiment suppresses the fogging of a window 2. A surroundings detection apparatus 10 that acquires information regarding an area around the self-vehicle is attached to the window 2. For example, the surroundings detection apparatus 10 is attached to a windshield 2 of the vehicle, and is an image capturing apparatus such as a camera that photographs the area in front of the self-vehicle through a transparent window panel (window glass), or a Radar or LiDAR that detects obstacles around the self-vehicle. In the present embodiment, an example will be described in which the surroundings detection apparatus 10 is a camera monitoring the surroundings of the self-vehicle. In the present embodiment, a configuration in which the surroundings detection apparatus 10 is attached to the windshield 2 of the vehicle will be described as an example. However, the present invention is not limited to this, and is also applicable to configurations in which the surroundings detection apparatus 10 is attached to the rear window, a side window, or other parts.

Figure 1A:
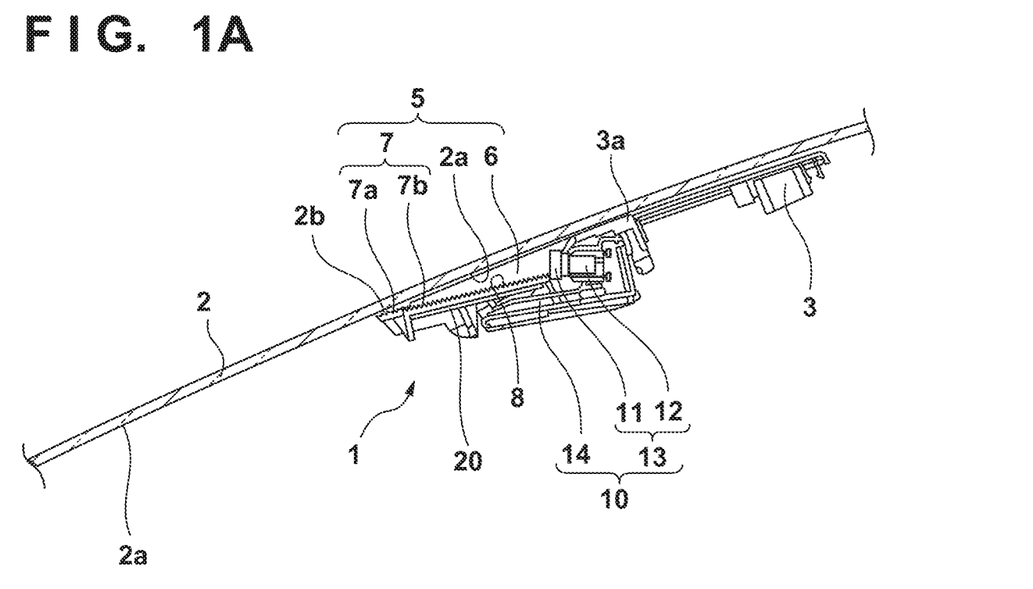
FIG. 1A is a cross-sectional view illustrating a structure in the vicinity of a window, in which a fogging suppression apparatus according to the present embodiment is included.
Figure 1B:
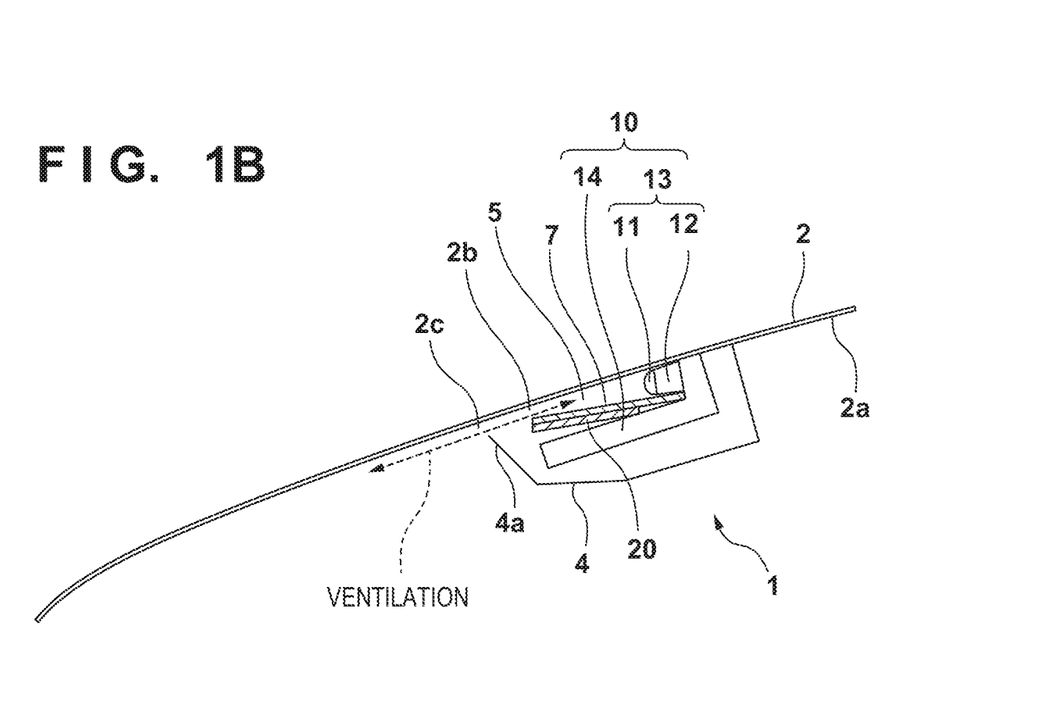
FIG. 1B is a schematic diagram corresponding to FIG. 1A.
Figure 2A:
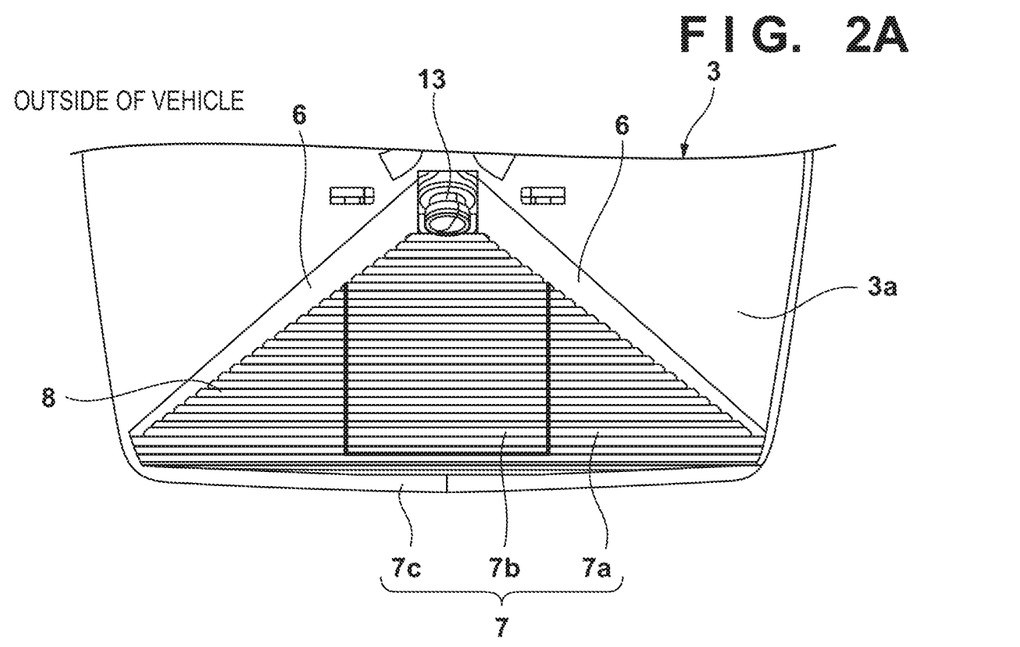
FIG. 2A is a plan view illustrating the fogging suppression apparatus according to the present embodiment as seen from the outside of a vehicle through the window.
Figure 2B:
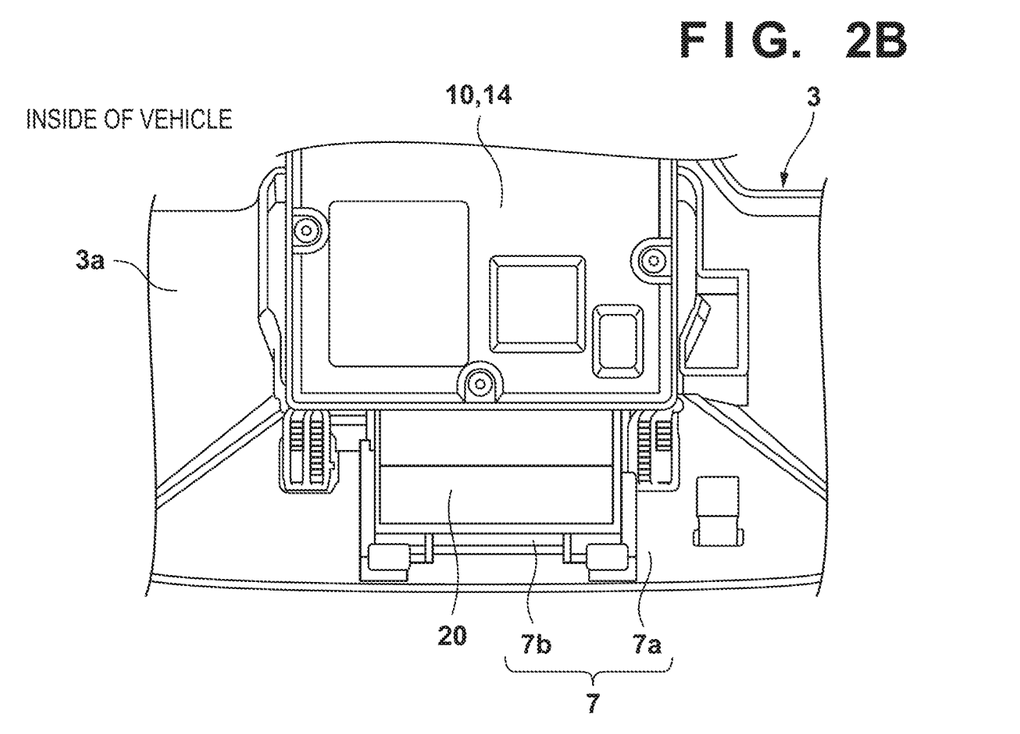
FIG. 2B is a plan view illustrating the fogging suppression apparatus according to the present embodiment as seen from the inside of the vehicle.

The camera 10 according to the present embodiment includes an image capturing unit 13 that is composed of a lens unit 11 and a sensor unit 12, and a camera main body unit 14 that performs image capturing processing using the image capturing unit 13 and performs image processing on image-captured data. The lens unit 11 forms, on the sensor unit 12, an image of the area in front of the vehicle entering through the windshield 2. The sensor unit 12 is constituted by an AD conversion circuit and a photoelectric conversion element such as a CMOS image sensor. The camera main body unit 14 generates image data by performing predetermined image processing on digital image signals output from the sensor unit 12.

The fogging suppression apparatus 1 according to the present embodiment includes a heating apparatus 20 that suppresses or removes fogging of the windshield 2, which transmits the optical image to be image-captured by the camera 10, and a control apparatus 30 that controls the activation (energization) and the deactivation (de-energization) of the heating apparatus 20. For example, the heating apparatus 20 is a heater that includes one or more heat generation elements that generate heat using the electric energy supplied during energization. The control apparatus 30 controls the energization of the heat generation elements. The heater has the shape of a rectangular sheet with small thickness but is not limited to this, and a defroster, a heating wire, etc., directly affixed to the window panel 2 may be used in place.

The camera 10 and the heater 20 according to the present embodiment are attached to a window panel surface (window glass surface) 2a of the windshield 2 that is located inside the vehicle cabin, in a state in which the camera 10 and the heater 20 are held by a bracket 3. The camera 10 and the heater 20 are attached to the upper end of a portion of the window panel surface 2a at the boundary between the window panel surface 2a and the roof in the center in the vehicle width direction. The entirety of the camera 10 and the heater 20 inside the vehicle cabin is covered by a cover member 4. FIG. 1A illustrates a state in which the cover member 4 is not attached. In a space portion 5 forward of the camera 10 in the bracket 3, diffuse reflection prevention processing (finishing) is applied to the part extending forward from the camera 10 as a structure 8 for preventing a decrease in the surroundings-detecting accuracy of the camera 10. For example, the diffuse reflection prevention processing is a shape in which groove portions extending in the vehicle width direction are arranged forward of the camera 10 in wave-like shapes, embossments, a coating, etc.

The bracket 3 includes a bracket main body portion 3a that holds the camera 10 and the heater 20, and that is attached to the windshield 2. The space portion 5 is formed forward of the camera 10 in the bracket main body portion 3a. The fan-shaped space portion 5 spreads out radially from both sides of the image capturing unit 13 of the camera 10 forward along the windshield 2 and outward in the vehicle width direction. The space portion 5 is formed from left and right lateral wall portions 6, a bottom surface portion 7, and the window panel surface 2a. The left and right lateral wall portions 6 extend radially and with left-right symmetry with the image capturing unit 13 of the camera 10 as the center. The left and right lateral wall portions 6 have a tapered shape such that the height of the left and right lateral wall portions 6 with respect to the window panel surface 2a decreases as the distance from the camera 10 increases. The bottom surface portion 7 includes a first bottom surface portion 7a that is connected to the left and right lateral wall portions 6, and a rectangular second bottom surface portion 7b that is configured to be separable from the first bottom surface portion 7a. The second bottom surface portion 7b is configured to be detachable from the first bottom surface portion 7a. The camera 10 and the heater 20 can be attached to the second bottom surface portion 7b, and the camera 10 and the heater 20 can be detached from the bracket 3 by detaching the second bottom surface portion 7b in a state in which the bracket 3 is attached to the windshield 2. The camera 10 and the heater 20 are attached to the surface of the second bottom surface portion 7b facing the inside of the vehicle cabin. Further, the diffuse reflection prevention processing is applied to the surfaces of the first bottom surface portion 7a and the second bottom surface portion 7b facing the windshield 2 side. In such a manner, the camera 10 is arranged at a position adjacent to the bottom surface portion 7, to which the diffuse reflection prevention processing is applied, and the heater 20 is arranged at the part at which the diffuse reflection prevention processing is applied. Due to this, the window panel surface 2a can be heated efficiently.

In a state in which the bracket 3 is attached to the windshield 2, a slit-shaped gap 2b that extends in the vehicle width direction is formed between the window panel surface 2a and a front end portion 7c of the first bottom surface portion 7a that is located farthest from the camera 10. Further, a gap 2c is also formed between the window panel surface 2a and a front end portion 4a of the cover member 4. The inside of the space portion 5 and the outside of the space portion 5 (the inside of the vehicle cabin) are placed in communication with one another through the predetermined gaps 2b and 2c, and the space portion 5 can be ventilated through the gaps 2b and 2c by the air inside the vehicle cabin, such as conditioned air generated by an air conditioning apparatus 40, being blown by a blower of the air conditioning apparatus 40.

In the present embodiment, fogging suppression control using the heater 20 is performed, in consideration of a case in which the fogging of the window panel surface 2a inside the space portion 5 cannot be suppressed by only the ventilation through the gaps 2b, 2c between the window panel surface 2a. The heater 20 heats an area of the window panel surface 2a in the space portion 5 that overlaps with the visual field range of the camera 10. By adopting such a configuration, the fogging of the windshield 2 overlapping with the visual field range of the camera 10 can be reduced, and a decrease in surroundings-detecting performance caused by a decrease in image quality, etc., can be prevented.

Figure 3:
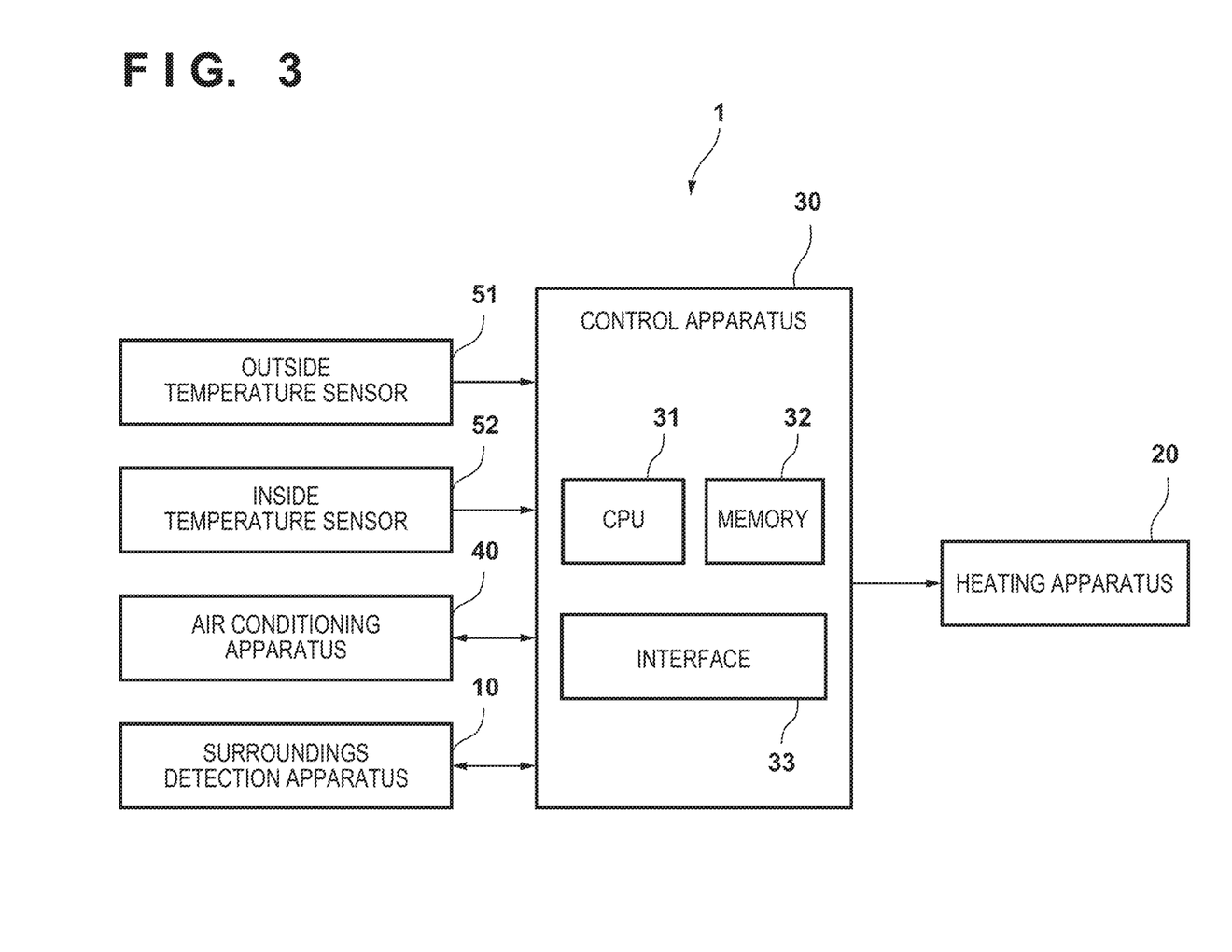
FIG. 3 is a diagram illustrating functional blocks realizing fogging suppression control according to the present embodiment.

Next, functional blocks for realizing the fogging suppression control according to the present embodiment will be described with reference to FIG. 3.

The fogging suppression control according to the present embodiment is realized by hardware such as the heating apparatus 20, the control apparatus 30, an outside temperature sensor 51, an inside temperature sensor 52, the air conditioning apparatus 40, etc., and a software program used by the control apparatus 30 to execute the fogging suppression control.

The control apparatus 30 includes a memory 32 that stores the program for the fogging suppression control, an arithmetic processing unit (CPU) 31 that reads out and executes the program stored in the memory 32, an interface circuit 33 that exchanges data with the other pieces of hardware, etc.

The outside temperature sensor 51 detects information regarding the temperature outside the vehicle, and outputs the detection result to the control apparatus 30. If the vehicle has an internal combustion engine, for example, the temperature outside the vehicle is the intake air temperature of the engine. The inside temperature sensor 52 detects information regarding the temperature inside the vehicle, and outputs the detection result to the control apparatus 30. The air conditioning apparatus 40 detects information regarding the operation state of the air conditioning apparatus 40 that is in accordance with user operations (including remote operations performed using a remote controller, etc.), and outputs the detection results to the control apparatus 30. For example, the operation state of the air conditioning apparatus 40 includes information regarding the on or off of the air conditioner (A/C), information regarding the defroster, information regarding the switching between fresh air and recirculation, and information regarding settings such as the temperature, the humidity, the wind amount, and the wind direction. Note that the control apparatus 30 may perform an estimation calculation using the above-described detection results to acquire information regarding the detection results. Furthermore, the control apparatus 30 may be configured so as to be built into the camera main body unit 14 of the camera 10 or may be configured so that the control apparatus 30 is separate from the camera 10 and connected to the camera 10 using a harness, etc.

Next, fogging suppression control processing according to the present embodiment will be described with reference to FIGS. 4 and 5.

First, the fogging suppression control processing according to the present embodiment will be described with reference to the timing chart in FIG. 4.

In the fogging suppression control according to the present embodiment, the control apparatus 30 switches the heater 20 on and off in accordance with a predetermined condition. The predetermined condition is a condition under which it can be expected that fogging of the window panel surface 2a in the space portion 5 forward of the camera will occur. If the predetermined condition is fulfilled, fogging suppression control for suppressing or removing fogging is performed by turning the heater 20 on.

In the fogging suppression control according to the present embodiment, the control apparatus 30 intermittently activates the heater 20 if the control apparatus 30 determines that the predetermined condition is fulfilled. The basic cycle of the intermittent activation of the heater 20 (referred to hereinafter as "heater control") by the control apparatus 30 includes: outputting a drive signal to the heater 20, and turning on the heater 20 and continuing the heating for a first period D1; following the elapse of the first period D1, stopping the output of the drive signal, and turning off the heater 20 and stopping the heating for a second period D2; following the elapse of the second period D2, outputting the drive signal once again, and turning on the heater 20 for a third period D3; and following this, repeating the second period D2 and the third period D3 until a termination condition is fulfilled. Here, the first period D1, the second period D2, and the third period D3 can be changed in accordance with the predetermined condition. However, the first period D1 is set to be longer than or equal to the second period D2, and the second period D2 is set to be longer than the third period D3 (D1≥D2>D3).

Figure 4:
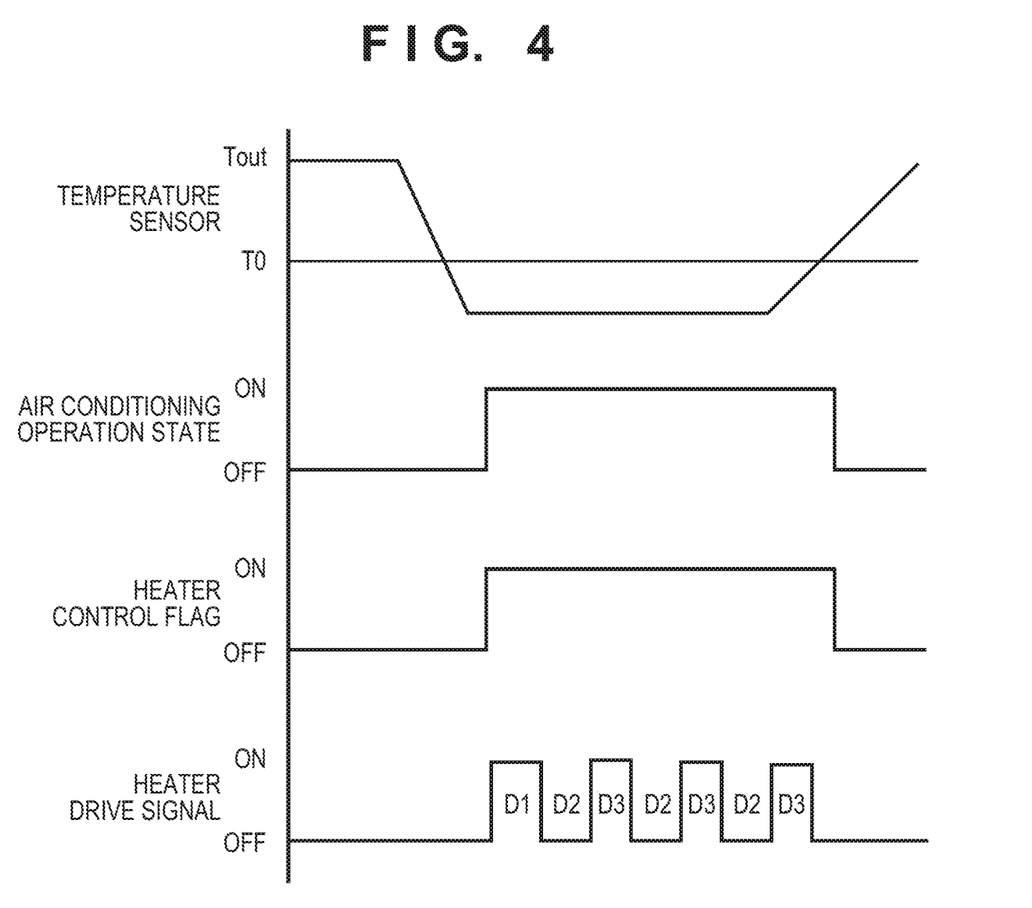
FIG. 4 is a timing chart describing the fogging suppression control according to the present embodiment.

In FIG. 4, the control apparatus 30 turns on a flag functioning as a trigger for starting the activation of the heater 20 if the control apparatus 30 determines that the predetermined condition is fulfilled, or that is, if the control apparatus 30 determines that the outside temperature Tout has become lower than or equal to a predetermined threshold TO and that a request for activation of the air conditioning apparatus 40 has been made through a user operation. Then, the control apparatus 30 keeps the flag on until the predetermined condition becomes unfulfilled, and continues the heater control while the flag is on. Accordingly, the window panel surface 2a in the space portion 5 forward of the camera is heated and fogging is suppressed or removed. Note that a configuration may be adopted in which, in place of a flag that is kept on once the condition is fulfilled and until the condition becomes unfulfilled, an on signal is output as a trigger signal for a short period of time when the condition is fulfilled and when the condition becomes unfulfilled.

Following this, the control apparatus 30 resets the flag to off and stops the heater control (stops the output of the drive signal) if the control apparatus 30 determines that the predetermined condition has become unfulfilled, or that is, if the control apparatus 30 determines that the outside temperature Tout has exceeded the predetermined threshold TO and/or that a request to stop the air conditioning apparatus 40 has been made through a user operation.

Overheating of the window panel surface 2a in the space portion 5 forward of the camera can be prevented by intermittently activating the heater 20 after the predetermined condition is fulfilled so that the window panel surface 2a is heated for the first period D1 and then the heating of the window panel surface 2a is stopped for the second period D2 in the manner described above. Furthermore, the load exerted on the power source such as the battery can be reduced by refraining from continuously activating the heater 20, and power consumption can be reduced by only using the battery from time to time.

Also, after the heater 20 is turned on and heating is performed for the first period D1, the heater 20 is turned off and heating is stopped for the second period D2, and then the heater 20 is turned on and heating is performed for the third period D3. If the air conditioning apparatus 40 is started in a situation in which the outside temperature Tout is low, the possibility is high that there is some room for adjustment in the state of the air inside the vehicle cabin. By activating the heater 20 in such a situation, unnecessary activation of the heater 20 can be suppressed and the fogging of the window panel surface 2a in the space portion 5 forward of the camera can be effectively reduced.

Furthermore, in the fogging suppression control according to the present embodiment, the control apparatus 30 is capable of changing the first period D1 in accordance with the outside temperature Tout, and sets the first period D1 longer for a lower outside temperature Tout. By adopting such a configuration, the initial heating period is extended when the outside temperature Tout is low, and thus, the temperature of the window panel surface 2a can be rapidly increased.

Furthermore, the control apparatus 30 is capable of changing the second period D2 in accordance with the outside temperature Tout, and sets the second period D2 (>D3) shorter for a lower outside temperature Tout. By adopting such a configuration, the interval between the initial heating period and the second heating period is reduced when the outside temperature Tout is low, and thus, a decrease in the temperature of the window panel surface 2a can be suppressed.

Furthermore, the control apparatus 30 executes the heater control, in which the control apparatus 30, after turning on the heater 20 and performing heating for the first period D1, turns off the heater 20 and stops the heating for the second period D2 before turning on the heater 20 and performing heating for the third period D3 and then repeating the second period D2 and the third period D3 until the termination condition is fulfilled. By adopting such a configuration, even if the outside temperature Tout is low, the window temperature can be maintained by performing heating for the third period D3, which is shorter than the first period D1, because the window temperature is already increased once heating is performed for the first period D1. Also, by setting the third period D3 shorter than the first period D1, overheating of the window panel surface 2a can be prevented.

Furthermore, the control apparatus 30 is capable of changing the third period D3 in accordance with the outside temperature Tout, and sets the third period D3 (<D2) longer for a lower outside temperature Tout. By adopting such a configuration, the temperature of the window panel surface 2a can be kept within a predetermined temperature range by extending the third period D3 when the outside temperature Tout is low.

Furthermore, the diffuse reflection prevention processing is provided in the photographing direction of the camera 10 and on the bottom surface portion 7 intersecting with the window 2, and the front end portion 7c positioned away from the camera 10 is arranged close to the window 2. Due to the diffuse reflection prevention processing being positioned close to the window 2 at a side distant from the camera 10 in such a manner, the space portion 5, which is the visual field range (photographing area) of the camera 10, is separated from the air inside the vehicle cabin by the diffuse reflection prevention processing. The change in temperature of the photographing area of the camera 10, which is separated from the air inside the vehicle cabin, is delayed with respect to the change in temperature of the air inside the vehicle cabin. Due to this, the fogging of the photographing area of the camera 10 can be reduced and a decrease in surroundings-detecting performance can be prevented by performing heating based on the predetermined condition.

Furthermore, by the diffuse reflection prevention processing being covered by the cover member 4, the delay with respect to the change in temperature inside the vehicle cabin increases to a further extent. Due to this, the fogging of the photographing area of the camera 10 can be reduced and a decrease in surroundings-detecting performance can be prevented by performing heating based on the predetermined condition.

Next, the operation procedures in the fogging suppression control processing according to the present embodiment will be described with reference to the flowchart in FIG. 5.

Figure 5:
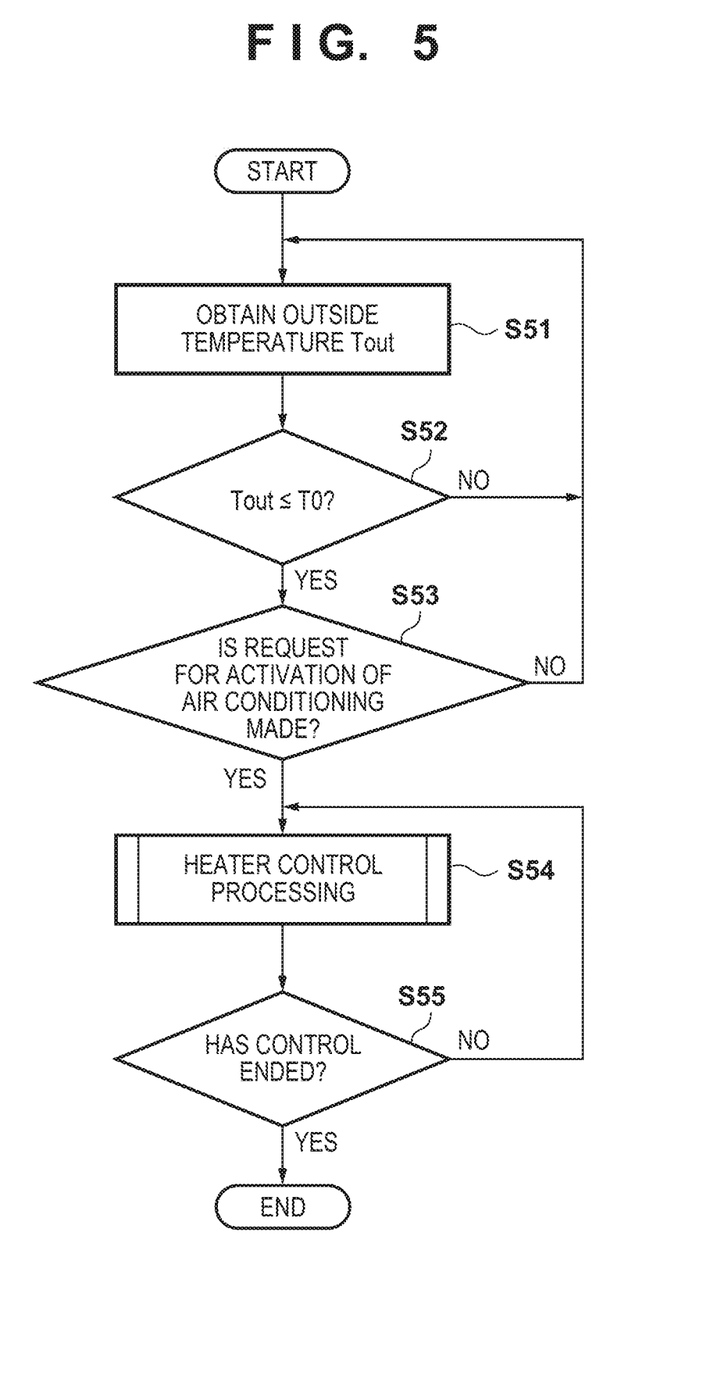
FIG. 5 is a flowchart illustrating fogging suppression control processing according to the present embodiment.

Note that the processing in FIG. 5 is realized by the CPU 31 of the control apparatus 30 executing the program relating to the fogging suppression control processing stored in the memory 32 and controlling the constituent elements of the fogging suppression apparatus 1.

In step S51, the CPU 31 receives a detection result of the outside temperature sensor 51 and acquires the outside temperature Tout.

In step S52, the CPU 31 determines whether or not the outside temperature Tout acquired in step S51 has decreased to lower than or equal to the predetermined threshold TO. The CPU 31 proceeds to step S53 if determining that the outside temperature Tout has decreased to lower than or equal to the predetermined threshold TO, and returns to step S51 and repeats the acquisition and determination regarding the outside temperature Tout if determining that the outside temperature Tout is not lower than or equal to the predetermined threshold TO.

In step S53, the CPU 31 determines whether or not a request for activation of the air conditioning apparatus 40 was made by a user operation. The CPU 31 proceeds to step S54 if determining that a request of activation was made, and returns to step S51 and repeats the acquisition and determination regarding the outside temperature Tout and the determination regarding the request of activation of the air conditioning apparatus 40 if determining that a request for activation is not made.

In step S54, the CPU 31 executes the heater control, in which the heater 20 is intermittently activated.

In step S55, the CPU 31 determines whether or not to terminate the heater control. The CPU 31 terminates processing if determining to terminate the heater control, and returns to step S54 and continues the heater control if determining not to terminate the heater control. The CPU 31 terminates the heater control if determining that the outside temperature Tout has exceeded the predetermined threshold TO and/or that a request to stop the air conditioning apparatus 40 has been made by a user operation, or if a state in which such a determination is made continues for a predetermined amount of time or longer.

The invention is not limited to the foregoing embodiment, and various variations/changes are possible within the spirit of the invention.

Additionally, in the present invention, a computer program corresponding to the fogging suppression control according to the above-described embodiment or a storage medium storing the computer program may be supplied to a computer mounted on a vehicle, and the computer may load and execute program codes stored in the storage medium.

Summary of Embodiment

First Aspect

A fogging suppression apparatus 1 that suppresses fogging of a window 2 of a vehicle, including:

an acquisition unit 51 that acquires an external temperature Tout of the vehicle;

a heater 20 that heats the window 2, the heater 20 differing from an air conditioning apparatus 40 including a blower provided in the vehicle; and a control unit 30 that controls the heater 20 so as to heat the window 2 when the external temperature Tout of the vehicle is lower than or equal to a predetermined temperature TO and there is a request for activation of the air conditioning apparatus 40.

According to the first aspect, because there is a high possibility that there is some room for adjustment in the state of interior air when the air conditioning apparatus is started in a situation in which the outside temperature is low, activating the heater in such a situation enables effective reduction of fogging of the window while suppressing unnecessary activation of the heater.

Second Aspect

In the first aspect, the control unit 30 heats the window 2 for a first period D1 using the heater 20, and then stops the heating of the window 2 for a second period D2.

According to the second aspect, overheating of the window can be prevented by activating the heater intermittently.

Third Aspect

In the second aspect, the first period D1 can be changed based on the external temperature Tout, and the control unit 30 sets the first period D1 longer for a lower external temperature Tout.

According to the third aspect, the initial heating period is extended when the outside temperature is low, and thus, the temperature of the window can be rapidly increased.

Fourth Aspect

In the second or third aspect, the second period D2 can be changed based on the external temperature Tout, and the control unit 30 sets the second period D2 shorter for a lower external temperature Tout.

According to the fourth aspect, the interval between the initial heating period and the second heating period is reduced when the outside temperature is low, and thus, a decrease in the temperature of the window can be suppressed.

Fifth Aspect

In any of the second to fourth aspects, after heating the window 2 for the first period D1 using the heater 20, the control unit 30 stops the heating of the window 2 for the second period D2, and then heats the window 2 for a third period D3 that is shorter than the first period D1.

According to the fifth aspect, even if the outside temperature is low, the window temperature can be maintained by performing heating for the third period, which is shorter than the first period, because the window temperature is already increased once heating is performed for the first period. Further, by setting the third period shorter than the first period, overheating of the window can be prevented.

Sixth Aspect

In the fifth aspect, the third period D3 can be changed based on the external temperature Tout, and the control unit 30 sets the third period D3 longer for a lower external temperature Tout.

According to the sixth aspect, the temperature of the window can be kept within a predetermined temperature range by extending the third period when the outside temperature is low.

Seventh Aspect

In any of the first to sixth aspects, the heater 20 includes a heater that generates heat using electric energy.

According to the seventh aspect, the load exerted on the power source can be reduced by reducing the activation timings of the heater.

Eighth Aspect

In any of the first to seventh aspects, the vehicle includes a surroundings detection apparatus 10 that performs detection with respect to the surroundings of the vehicle, and the heater 20 heats an area that is a detection area of the surroundings detection apparatus 10 and that overlaps with the window 2.

According to the eighth aspect, a visual field range of the surroundings detection apparatus can be heated using the heater, and thus, the fogging of the detection area can be reduced and a decrease in surroundings-detecting performance can be prevented.

Ninth Aspect

In the eighth aspect, the surroundings detection apparatus 10 is arranged adjacent to a structure 8 for preventing a decrease in surroundings-detecting accuracy, and the heater 20 is supported by a member 7 including the structure 8.

According to the ninth aspect, the window can be heated effectively because the heater is installed in the structure for preventing a decrease in detecting accuracy, which is arranged adjacent to the surroundings detection apparatus.

Tenth Aspect

A method of controlling a fogging suppression apparatus 1 that suppresses fogging of a window 2 of a vehicle, wherein the fogging suppression apparatus 1 includes:

an acquisition unit 51 that acquires an external temperature Tout of the vehicle; and a heater 20 that heats the window 2, the heater 20 differing from air conditioning apparatus 40 including a blower provided in the vehicle, and the control method includes controlling (step S54) the heater 20 so as to heat the window 2 if the external temperature Tout of the vehicle is lower than or equal to a predetermined temperature TO (YES in step S52) and there was a request for activation of the air conditioning apparatus 40 (YES in step S53).

According to the tenth aspect, because there is a high possibility that there is some room for adjustment in the state of interior air when the air conditioning apparatus is started in a situation in which the outside temperature is low, activating the heater in such a situation enables effective reduction of fogging of the window while suppressing unnecessary activation of the heater.

What is claimed is:

1. A fogging suppression apparatus that suppresses fogging of a window of vehicle, comprising:

a heater that heats the window, the heater differing from an air conditioning apparatus including a blower provided in the vehicle; and a processor and a memory coupled to the processor and storing instructions that, when executed by the processor, cause the processor to function as:

an acquisition unit that acquires an external temperature of the vehicle; and a control unit that performs control of the heater to heat the window when a control start condition in which the external temperature of the vehicle is lower than or equal to a predetermined temperature and there is a request for activation of the air conditioning apparatus, wherein the control is a process that includes a first period and a third period for performing the heating of the window and a second period for stopping the heating of the window, and repeats the second period and the third period immediately after the first period, and the process is started after the control start condition is met first and continued until a control stop condition is met, the first period is set to be longer than or equal to the second period, and the second period is set to be longer than the third period, the third period is set to be longer for a lower external temperature.

2. The fogging suppression apparatus according to claim 1, wherein the first period can be changed based on the external temperature, and the control unit sets the first period longer for a lower external temperature.

3. The fogging suppression apparatus according to claim 1, wherein the second period can be changed based on the external temperature, and the control unit sets the second period shorter for a lower external temperature.

4. The fogging suppression apparatus according to claim 1,
wherein the heater generates heat using electric energy.

5. The fogging suppression apparatus according to claim 1,
wherein the vehicle includes a surroundings detection apparatus that performs detection with respect to the surroundings of the vehicle, and
the heater heats an area that is a detection area of the surroundings detection apparatus and that overlaps with the window.

6. The fogging suppression apparatus according to claim 5,
wherein the surroundings detection apparatus is arranged adjacent to a structure for preventing a decrease in surroundings-detecting accuracy, and
the heater is supported by a member including the structure.

7. A method of controlling a fogging suppression apparatus that suppresses fogging of a window of a vehicle,
wherein the fogging suppression apparatus includes:
a heater that heats the window, the heater differing from an air conditioning apparatus including a blower provided in the vehicle, and
a processor and a memory coupled to the processor and storing instructions that, when executed by the processor, cause the processor to function as:
an acquisition unit that acquires an external temperature of the vehicle; and
the control method comprises
performing control of the heater to heat the window when a control start condition in which the external temperature of the vehicle is lower than or equal to a predetermined temperature and there is a request for activation of the air conditioning apparatus,
wherein the control is a process that includes a first period and a third period for performing the heating of the window and a second period for stopping the heating of the window, and repeats the second period and the third period immediately after the first period, and
the process is started after the control start condition is met first and continued until a control stop condition is met,
the first period is set to be longer than or equal to the second period, and the second period is set to be longer than the third period, the third period is set to be longer for a lower external temperature.

* * * * *